(12) United States Patent
Casagrande (10) Patent No.: US 9,424,881 B2
(45) Date of Patent: Aug. 23, 2016

(54) SELECTIVE PLACEMENT OF PROGRESS BAR

(71) Applicant: EchoStar Technologies L.L.C., Englewood, CO (US)

(72) Inventor: Steven M. Casagrande, Castle Rock, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 143 days.

(21) Appl. No.: 14/275,194

(22) Filed: May 12, 2014

(65) Prior Publication Data

US 2015/0326912 A1 Nov. 12, 2015

(51) Int. Cl.
| | |
|---|---|
| *H04N 5/775* | (2006.01) |
| *G11B 27/00* | (2006.01) |
| *H04N 21/61* | (2011.01) |
| *H04N 21/485* | (2011.01) |
| *H04N 21/472* | (2011.01) |
| *H04N 21/431* | (2011.01) |
| *H04N 21/432* | (2011.01) |
| *H04N 21/44* | (2011.01) |
| *H04N 21/488* | (2011.01) |

(52) U.S. Cl.
CPC .............. *G11B 27/00* (2013.01); *G11B 27/005* (2013.01); *H04N 21/4312* (2013.01); *H04N 21/4325* (2013.01); *H04N 21/44008* (2013.01); *H04N 21/472* (2013.01); *H04N 21/47217* (2013.01); *H04N 21/4858* (2013.01); *H04N 21/4884* (2013.01); *H04N 21/6143* (2013.01)

(58) Field of Classification Search
CPC ....... H04N 5/775; H04N 5/85; H04N 9/8042; G11B 27/34; G11B 27/105
USPC ......................................................... 386/230
See application file for complete search history.

(56) References Cited

U.S. PATENT DOCUMENTS

| | | | | |
|---|---|---|---|---|
| 2009/0129749 | A1* | 5/2009 | Oyamatsu | G11B 27/11 386/241 |
| 2009/0158326 | A1* | 6/2009 | Hunt | G06F 3/04817 725/38 |
| 2010/0150522 | A1* | 6/2010 | Schmehl | H04N 5/44513 386/343 |

* cited by examiner

*Primary Examiner* — William C Vaughn, Jr.
*Assistant Examiner* — Daniel Tekle
(74) *Attorney, Agent, or Firm* — Seed IP Law Group PLLC (57) ABSTRACT

Methods and apparatus are disclosed for selecting the placement of a progress bar that is displayed on top of audiovisual content being presented on a display device when a viewer issues a "trick-play" command to change the rate at which the audiovisual content is being presented, such as rewind, pause, or fast-forward. The placement of the progress bar is selected such that it does not obscure audiovisual content used by the viewer to determine how long to issue the trick-play command.

16 Claims, 12 Drawing Sheets

SELECTIVE PLACEMENT OF PROGRESS BAR

BACKGROUND

1. Technical Field

The present disclosure relates to selecting the placement of a progress bar over audiovisual content being presented on a video display so that portions of the content that are important to the viewer are not obscured.

2. Description of the Related Art

A progress bar is displayed when a viewer, for example while watching a television program, issues what is called in the art a "trick-play" command. The "trick-play" will change the rate at which video content is presented on the display—such as, for example, when a viewer uses a remote control connected to a set-top box to issue different types of trick-play commands to pause, fast-forward or rewind presentation of content on the display. A progress bar typically displays information about the rate at which the content is presented, the type of trick-play function being performed, and the location of the current displayed video frame in relation to the stored video content that can be displayed to the viewer. A progress bar is typically horizontal and made up of multiple parts overlaid on top of a video image presented on a display, and remains on the display while the trick-play command is being performed. Progress bars are typically displayed at fixed locations, for example centered at the bottom of the video display.

BRIEF SUMMARY

The present disclosure proposes systems and methods to select the placement of a progress bar on a video display so that the displaying of the progress bar does not obscure visual content information that is important to the viewer.

For example, a viewer watching a television display of a basketball game previously recorded on a set-top box uses the remote control to issue a trick-play "fast-forward" command to fast-forward through the recorded game to get to a critical part of the game that interests the viewer. This may be where the scores of the two teams are within two points, or a specific time on the game clock such as the last two minutes of the first half. During the time the viewer is going to find this critical part of the game, a progress bar is displayed to show details of the fast-forwarding operation with respect to the recorded video content.

If this progress bar appears on the display in a location that obscures the game scores or the game clock, he cannot see this data. The viewer will have to stop fast-forwarding to remove the progress bar, look at the scores or the game clock, and then begin fast-forwarding again. This process will need to be repeated until the viewer gets to the part of the game the viewer is interested in seeing.

Video content providers typically determine the location of text data information presented on a video display. For example, different sports programming providers will show scores and the game clock at different locations on the screen. With the methods and systems described herein, the placement of the progress bar may be selected on the video display to avoid covering important information needed during fast-forwarding such as the game scores or the game clock.

In another example, a viewer may have recorded a business network program featuring an interview with a business leader that includes text information related to the interview that scrolls in a location on the screen. The viewer may want to fast-forward or rewind through the recorded program to listen only to the portion of the interview related to a particular topic displayed in the scrolling location. However, this process becomes cumbersome and tedious if the progress bar displayed during the fast-forwarding process obscures the text information in the scrolling location.

Selecting the placement of the progress bar on the display may occur in a number of different ways. For example, in one embodiment information is received, based on characteristics of a particular program or on characteristics of all programs carried by a particular channel, that identifies locations on a display that should not be covered by a progress bar. In another embodiment, the video content presented on the display may be analyzed to determine where important information is displayed, and the progress bar then placed in other areas. In some cases, the progress bar may be moved dynamically if location of important information on the display changes. In other embodiments, the viewer moves where the progress bar is located on the display or changes progress bar characteristics such as shortening it, making it partially transparent, or changing its shape or orientation.

DETAILED DESCRIPTION

Figure 1:
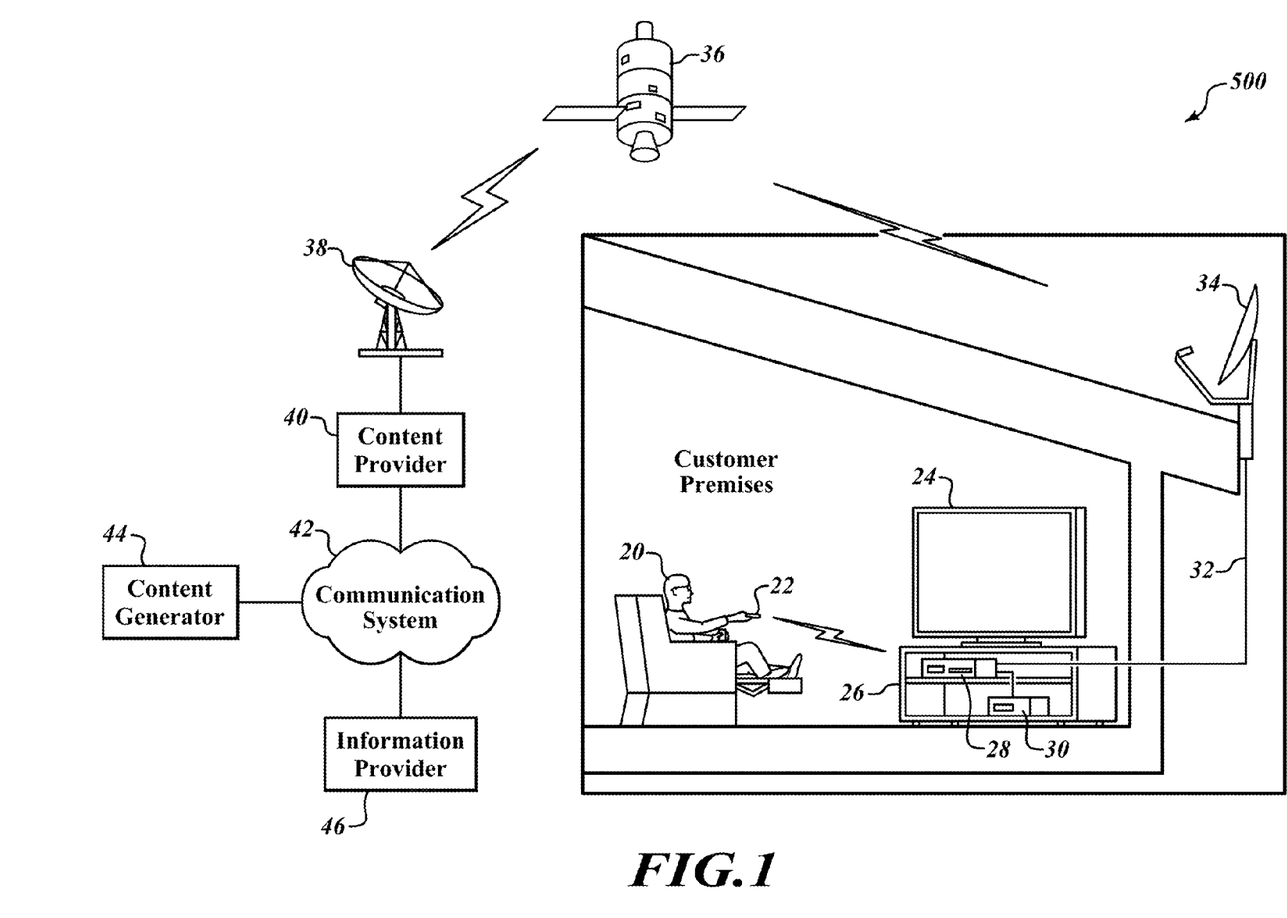
FIG. 1 shows a context diagram for an embodiment of the disclosure.

FIG. 1 shows context diagram 500 for one embodiment of selective placement of a progress bar. Viewer 20 watches video content on display device 24 and uses remote control 22 to control and view audiovisual content being displayed. Display device 24 is connected to one or more audiovisual components 26 used to receive an audiovisual signal containing audiovisual content for display on display device 24. Audiovisual components 26 may include set-top box device 28 that is connected to coaxial cable 32. Set-top box device 28 receives incoming audiovisual signals, converts them into audiovisual content and stores that content for later viewing. Set-top box device 28 is connected to display device 24, and is controlled using remote control 22. In other related embodiments, there may be a separate recording device, such as digital video recorder (DVR) 30 connected to and controlled by set-top box 28 to store content for later viewing on display device 24. In some embodiments, set-top box 28 displays audiovisual content on display 24 that is received in real time when viewer 20 selects a particular channel on set-top box 28, while also storing the received audiovisual content so that viewer 20 may access it later.

In one or more embodiments, remote control 22 is a universal remote control able to communicate with display device 24, set-top box 28 and/or DVR 30. The remote control 22 is used to select audiovisual content to record on set-top box 28 and to view on display device 24, or to issue trick-play commands such as pause, fast-forward or rewind stored audiovisual content that is displayed on device 24.

Other embodiments may include other components included within audiovisual components 26 such as computers, tablets, smart phones, DVR devices connected to cable, DVR devices connected to over-the-air (OTA) broadcast, DVR devices connected to Internet Protocol Television (IPTV), DVD devices, and the like.

In the current embodiment, audiovisual signals containing audiovisual content are received via coaxial cable line 32, which is connected to satellite dish 34. In other embodiments, the signal is received by a cable head end (not shown) and sent to the customer's residence via coaxial cable 32. In other embodiments, audiovisual content may be received by computers, tablets, smart phones, or other similar devices able to receive audiovisual content through a wired or wireless connection.

In the current embodiment, satellite dish 34 receives audiovisual content within an audiovisual signal received from satellite 36 that originated from satellite ground station 38. It should be noted that the audiovisual content received by satellite dish 34 will include audiovisual programming content for hundreds, if not thousands, of different channels, each containing different programs. The information for each channel and program will include audiovisual content as well as metadata describing information about the audiovisual content, for example an identification of the channel the program is originating from, the program title, program type, program rating and other data associated with the program.

Content providers 40 aggregate and provide audiovisual content that is sent through satellite ground station 38. This aggregated audiovisual content may be distributed a number of ways, for example as streamed content in the form of a series of audiovisual programs, such as movies, series shows, advertisements, music concerts, infomercials, documentaries, and the like that are transmitted on certain channels at certain times of the day. In other examples, audiovisual content is available for retrieval on-demand through a subscription service, where a viewer 20 can order a program that is sent to the viewer's set-top box 28 for viewing at any time. Commonly, content providers 40 are considered to be "channels" like, ESPN, HBO, Showtime, AMC, network broadcasting companies like NBC, ABC, and CBS, as well as independent content providers such as public television or private network providers.

Content providers 40 receive program content through communication system 42, which may include a cloud service, the Internet, local area networks, wide area networks, X.25 networks, private networks or other electronic communication systems. In some embodiments, communication system 42 may consist of offline delivery methods such as videotape or DVD discs sent by physical means such as by mail or by courier. Content generators 44 generate program content that is delivered by content providers. Example of content generators 44 include film and television studios, private film production companies, documentary filmmakers, sports organizations such as the NFL®, NCAA®, advertisement production companies and the like. In some instances, a content provider 40 may also be a content generator 44.

Information providers 46 provide information and data related to the content produced by content generators 44, as described above. This information may include metadata, program name, closed-caption authoring and placement within the content, and the like. The information and the associated content is sent through communication system 42 to the content providers 40 in preparation for distribution. In some embodiments, the content provider 40, content generator 44, and information provider 46 may be the same company, for example ESPN in the case of sports programming, and AMC in the case of dramatic programming.

Although FIG. 1 depicts a viewer 20 using a remote control 22 to view audiovisual content displayed on display device 24, in other embodiments a viewer may be viewing audiovisual content in any location using any suitable viewing device. For example, a mobile device, such as a tablet, a laptop, or a smartphone that is receiving content from content provider 40 over a wireless Internet network connection.

Figure 2A:
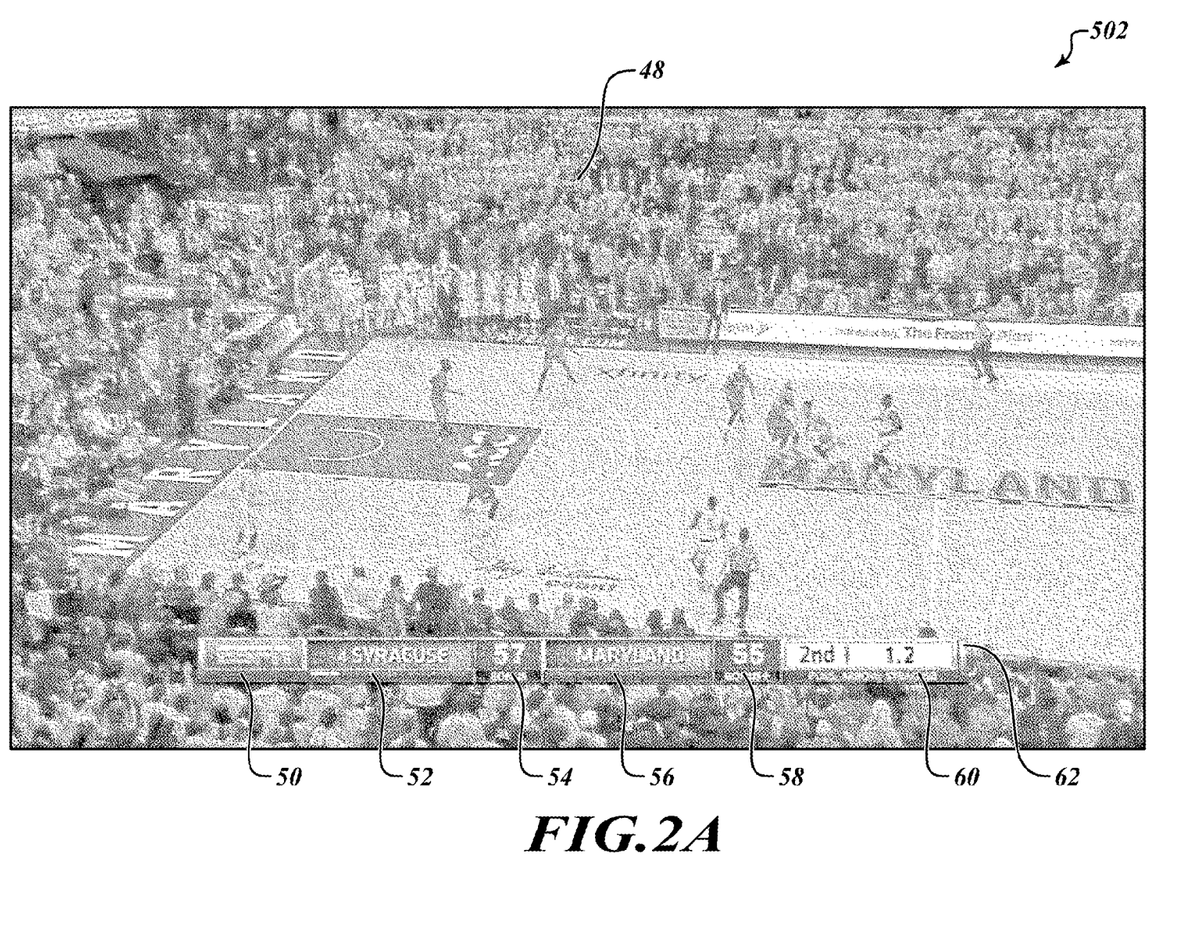
FIGS. 2A and 2B show an example of a basketball game displaying a score and a game clock, before and after placement of a progress bar.

FIG. 2A shows diagram 502, containing an image 48 of a basketball game displayed on display device 24 viewed by viewer 20, who is using remote control 22 to control what is displayed on display device 24. The basketball game displayed includes basketball players, the basketball court, referees, and fans in stands surrounding the court. Information about the game is also displayed in information bar 62 that is displayed throughout the game. Information bar 62 includes channel identifier 50 of the channel carrying the basketball program, in this case ESPN; the name of the first team 52 (Syracuse), the current score of the first team 54 (here the score is 57), the name of the second team 56 (Maryland), and the score of the second team 58 (here the score is 55). Game clock 60 is also shown, with 1.2 seconds left in the second half of the game.

In this example, information bar 62 is provided by ESPN as part of the received audio content, and is displayed in a standard location for ESPN, in this case centered along the bottom of the screen, slightly above the bottom edge of image 48. In a typical embodiment, the location of information bar 62 may be in a fixed location for a particular content provider 40 (e.g., ESPN). Other content providers 40, such as CBS, Fox Sports, or NBC, may put their information bar 62 in a different location on the screen, or in some examples put their information bar 62 in one of several distinct locations on the screen. For example, CBS typically puts information bar 62 near the top of image 48 (not shown) for football games, but near the bottom of image 48 (not shown) for basketball and other games.

Figure 2B:
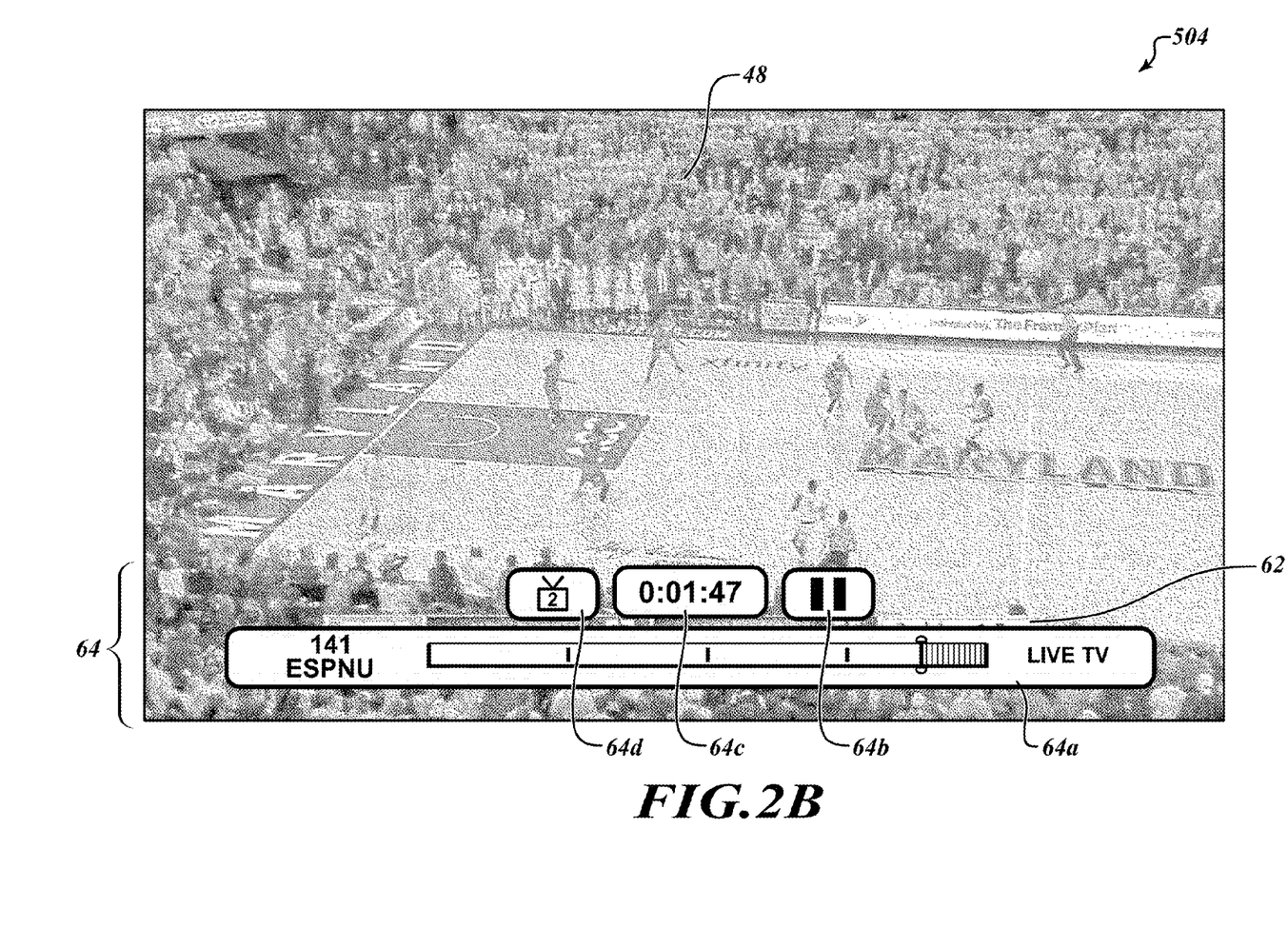

FIG. 2B shows diagram 504, containing image 48 from FIG. 2A, but with and addition of one embodiment of a progress bar 64 at the bottom of image 48. Progress bar 64 is generated by set-top box 28 and displayed on display device 24 when the viewer 20 uses remote control 22 to initiate a trick-play command (pause, rewind, fast-forward) to change the rate at which audiovisual content is displayed by set-top box 28 on display device 24.

Progress bar 64 is displayed when viewer 20 selects the pause button on remote control 22. Progress bar 64 includes a timing bar 64a that displays the channel number (141), channel name (ESPN), and a positioning bar that shows at what point within the recorded content the current frame 48 is being displayed. Command area 64b displays a pause symbol showing the trick-play command viewer 20 sent using remote control 22. Viewer 20 will typically pause audiovisual content to allow an in-depth viewing of an image to pick out particular features important to the viewer for example to locate individual players and to determine what each player is doing. In other examples, area 64b may show a double right arrow to indicate fast forward, or double left arrow to indicate rewind. Command area 64a may also show X4, X8, X10 or the like, to show the video is being shown at 4, 8, or 10 times the normal speed. The time button 64c shows the amount of time in minutes and seconds between the current frame that is being displayed and the beginning of the recorded audiovisual sequence. The input button 64d indicates the input in set-top box 28 input on which the currently viewed audiovisual content is received. In this example, progress bar 64 is based on the Dish TV® format for displayed progress bars.

In this example, a progress bar 64 is generated by set-top box 28 and is overlaid upon the information bar 62 that is provided by audiovisual content provider ESPN. Progress bar 64 almost completely obscures information bar 62, as well as information inside it. If viewer 20 wishes to use trick-play commands to fast-forward or rewind in order to view a specific point in the basketball game, for example to watch the game around the time of a particular score or a particular time on the game clock, this becomes difficult to do. Viewer 20 will repeatedly start and stop trick-play commands in order to view the information on information bar 62 to determine the specific point in the basketball game viewer 20 wants to reach.

Figure 3A:
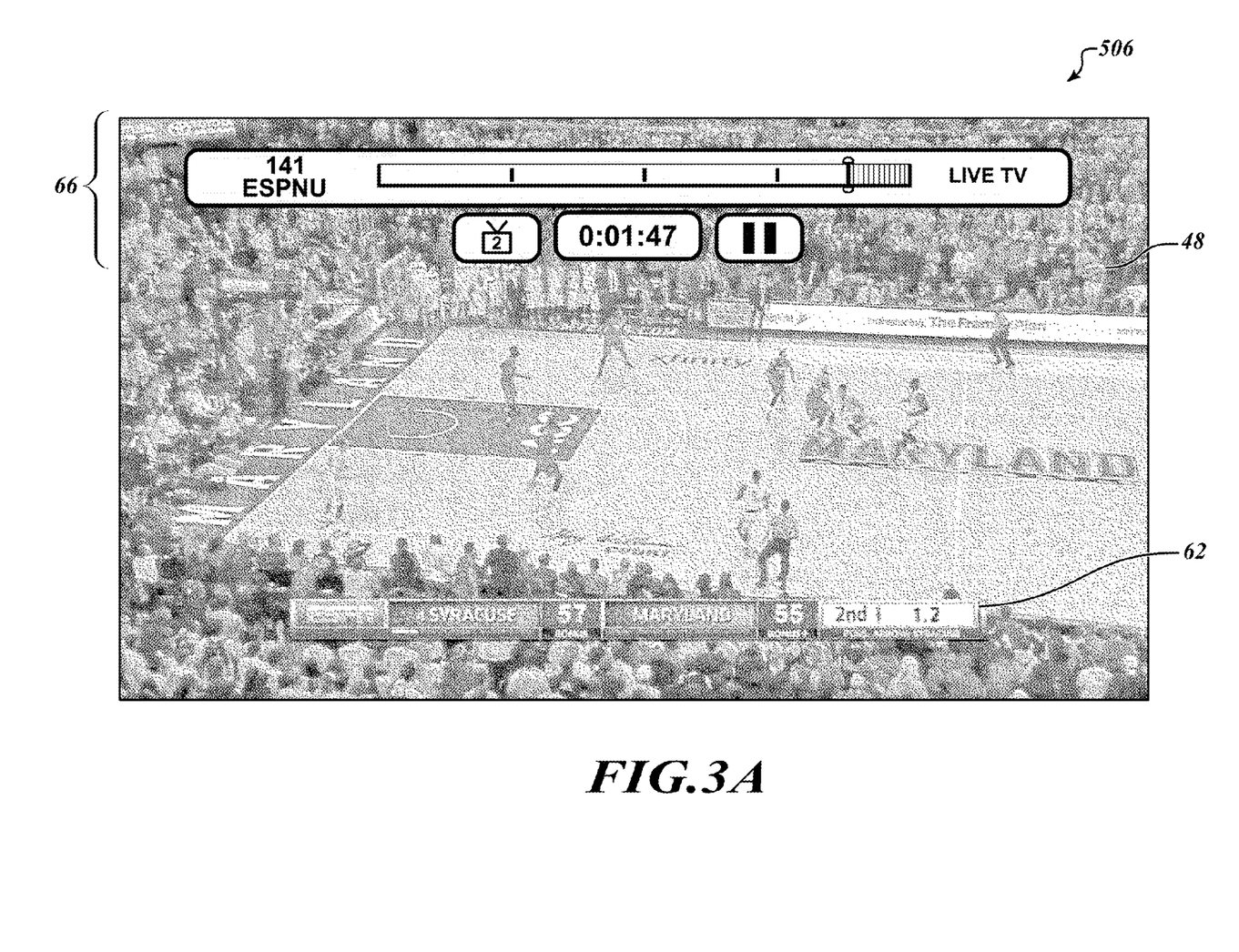
FIGS. 3A-3F show examples of various embodiments of moving progress bars to different locations on a video display.

FIG. 3A shows an example embodiment of a process for moving the location of a progress bar on a display by using information taken from a channel or from within an individual program to determine areas that a progress bar should not obstruct. Diagram 506 shows image 48 from FIG. 2A of a basketball game displayed on display device 24. Here however, progress bar 66 has been moved to a different location on the display, at the top of the screen, and no longer obscures information bar 62. With the progress bar 66 in this position, it is easy for the viewer 20 to see the team scores and/or game clock 20 displayed within information bar 62, even as the viewer 20 sends trick-play commands to set-top box 28 to rewind, pause, or fast forward to the desired point within the basketball game.

In examples of one or more embodiments, the progress bar placement system 144 receives information about where important information is placed within audiovisual content being displayed, for example from set-top box 28, and uses this information to determine where to place progress bar 66. Examples of these one or more embodiments are further described in flow diagram FIG. 4A.

In one example, standards are created by individual channels that define where the channel places text or game score update information on the visual display. For example, the ESPN channel, whenever it displays sports programs, has one or more known particular locations on the screen in which they will put important text and game information about the sports program. Basketball sports programs will always display information bar 62 in the same display location as shown, centered and near the bottom for ESPN. In contrast, in some examples CBS places score and game clock information in one of several locations, for example at the bottom of the audiovisual display for basketball games it broadcasts and at the top of the audiovisual display for football games.

The progress bar placement system 144 will recognize that the displayed content is on the ESPN channel, and then place progress bar 66 at or near the top of image 48 to avoid obscuring information bar 62. For CBS, it will be the opposite. These standards may be provided to an individual set-top box 28 either by data sent by content provider 40 or by another data source.

In other examples, data contained within an individual audiovisual program will indicate where important text information is placed on the visual display. This data may be embedded into the programs' audiovisual content, or may be part of a related data stream. In these examples, a sports program showing a basketball game associated with image 48 may have, as part of the information associated with that particular sports program, a defined area where information bar 62 is located. This information can be obtained by a data query to determine where the important text information is located and then the progress bar 66 can be placed so that it will not obstruct the important text on the screen.

In still other examples, information may be contained within a single frame or sequences of frames within an audiovisual program identifying the location of important text information that should not be obstructed by a progress bar.

Figure 3B:
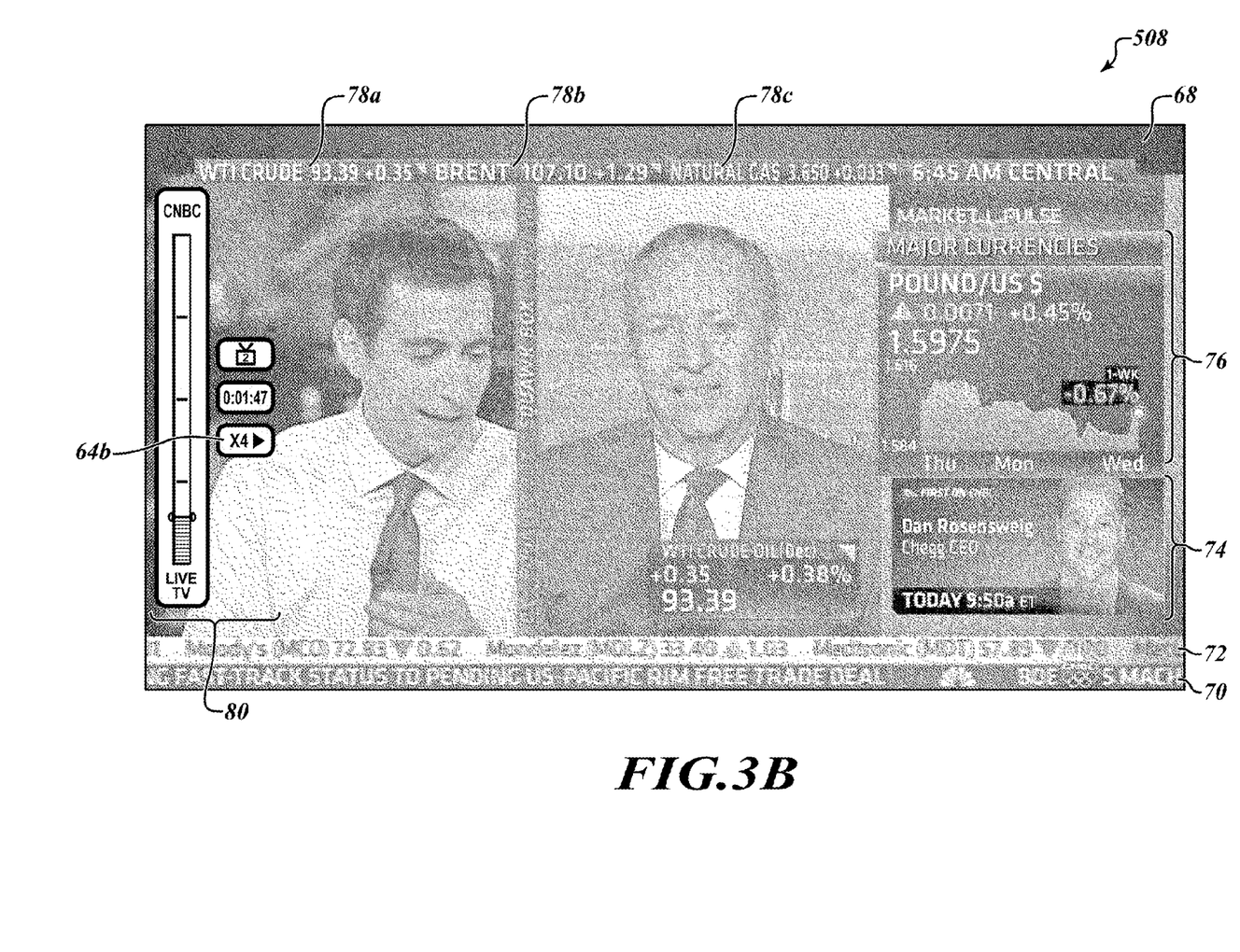

FIG. 3B describes an example of one or more embodiments of a process for selecting the location of a progress bar on a display by analyzing text and graphics information within the audiovisual content to determine locations on the display a progress bar should not obstruct. Diagram 508 shows an example of a business program image 68 that contains a large number of areas with information that may be important to viewer 20 that should not be blocked by a progress bar. For example, on image 68 there is a rolling ticker tape bar 70 at the bottom of screen 68 with news captions. Just above it is a ticker tape bar 72 that has individual stocks and current stock price quotes. A panel 74 regularly changes to announce upcoming program events on the channel. Flip panel 76 displays continually updating currency prices that cycle through major currencies showing the increase and decrease in price for the day, the increase or decrease percentage over the week, and a bar graph with varying axes. Areas on display 68 also include constantly updated prices for various commodities such as West Texas Crude Oil prices 78a, Brent Crude prices 78b, and natural gas prices 78c that update every several seconds.

In one or more embodiments, the progress bar placement system 144 analyzes the visual information displayed on the screen, and determines from that analysis where areas of important text information are on the image that should not be blocked by a progress bar. In one example, progress bar placement system 144 analyzes the video stream to look for overlaid text data. In another example, it views the video stream to look for scrolling news bars, static text or other display input that is not a standard video image. It can also look for text displayed from the audiovisual content and matches keywords to identify possible important areas. For example, identifying ticker names of stocks, numbers displayed in a time format, and words such as "quotes", "breaking news", "market update" and the like will indicate important areas for business programs.

In another example, text displayed in sports programs, such as "score", "game clock", "timeouts", "time left" and the like will indicate important areas on the screen for sports programs. In another example, a text that stays in the same position on the screen for a long time indicates an important area. In yet another example, a text that either roles, or scrolls across the screen and a regular rate, such as ticker tape bar 70 and 72 may indicate an important area. Each of these examples, as well as other related examples, may use known text identification algorithms and graphics identification algorithms to determine where these important areas are.

Once important areas in the audiovisual content are identified, the location of the progress bar displayed during trick-play commands can be selected as appropriate. For example, in image 68 progress bar 80 is positioned in such a way that viewer 20 may see all important information while, for example, rewinding or fast-forwarding through the program. For the progress bar 80, the trick-play shown is to move fast forward at 4 times the standard speed, so a X4 is shown in type box 64a. Here, the progress bar placement system oriented progress bar 80 vertically and placed it to the far left of screen 68 so that the important fields described above are not obstructed.

Figure 3C:
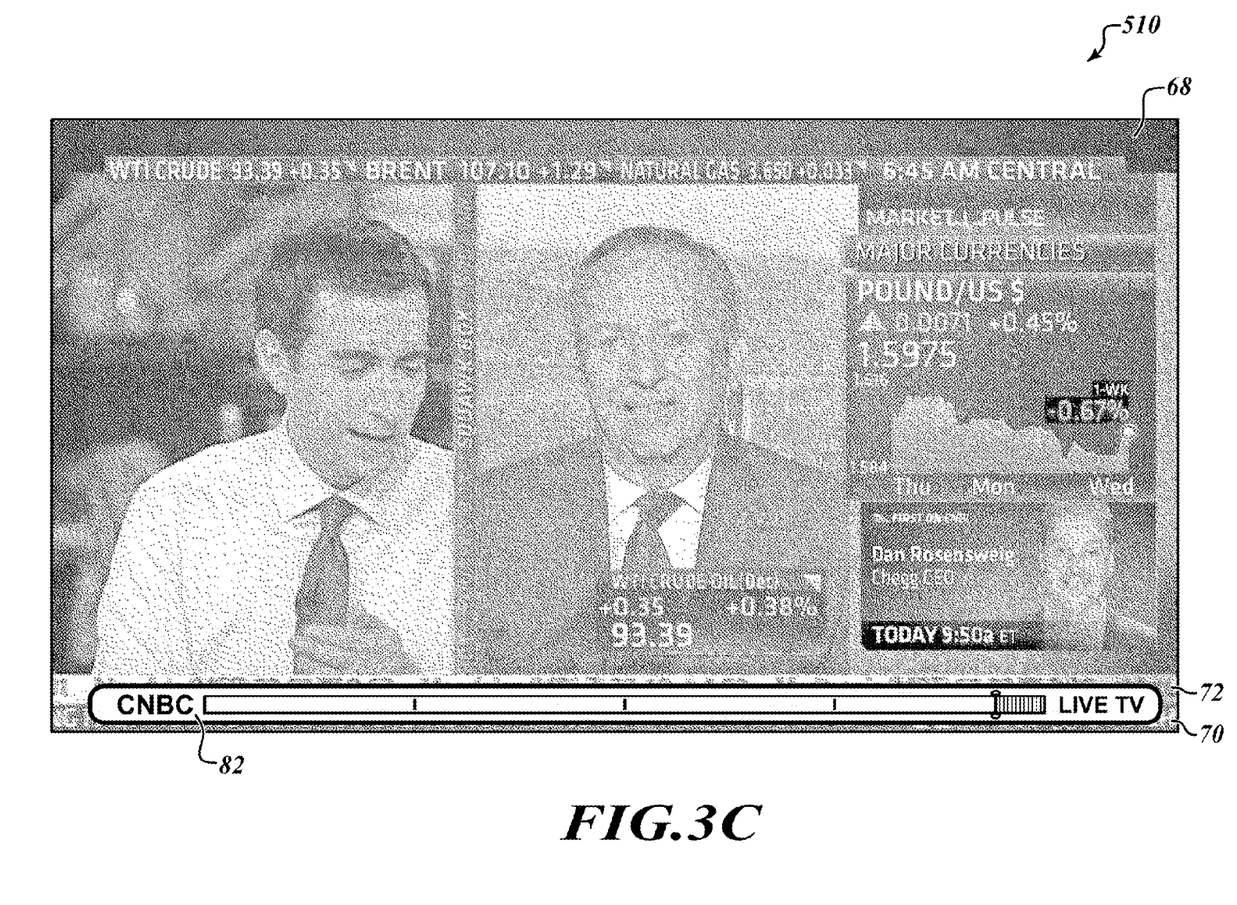
Figure 3D:
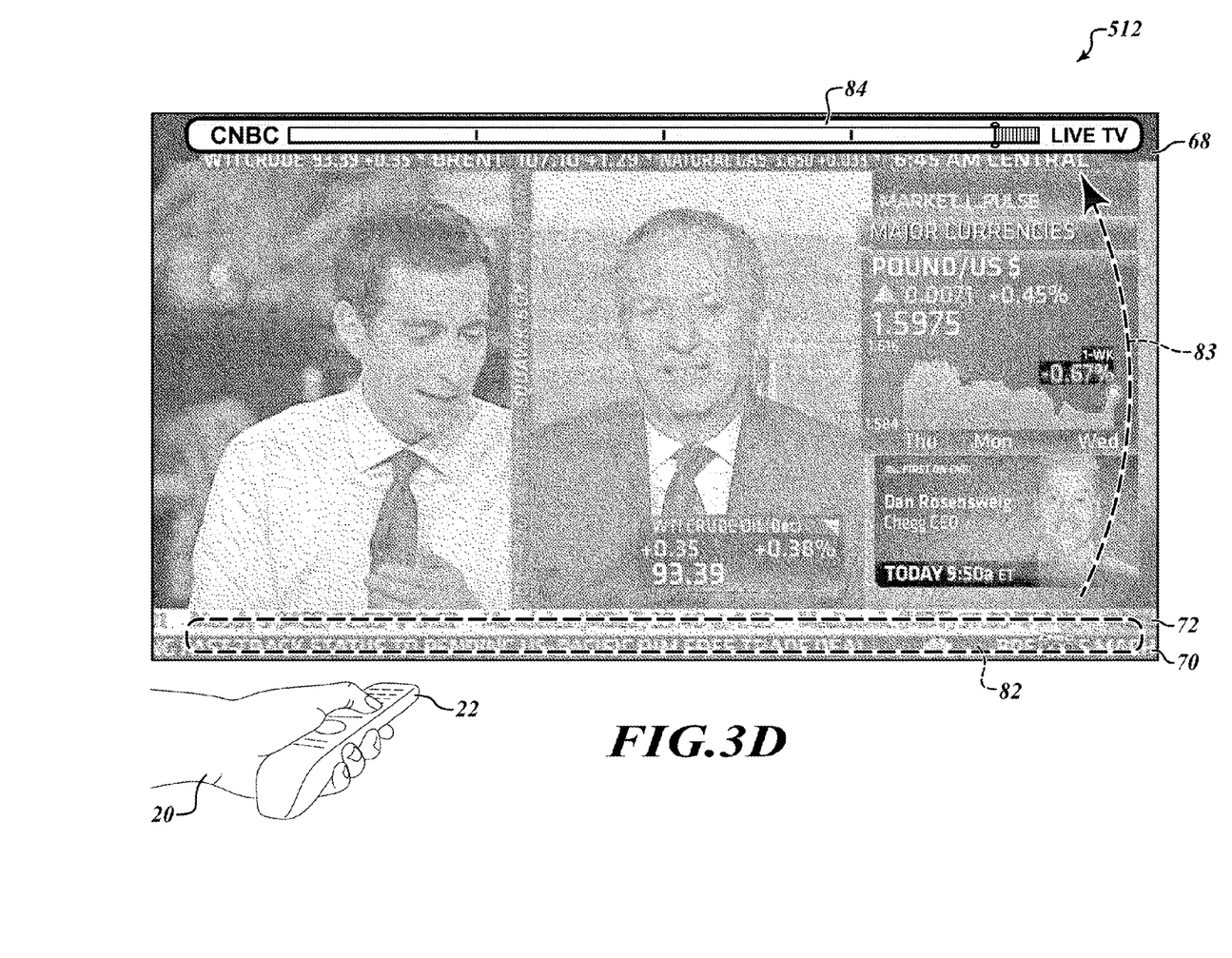

FIGS. 3C and 3D show an example of embodiments of a process for moving the location of a progress bar on a display by using commands taken directly from a viewer 20 to move the progress bar to an area on display 24 that viewer 20 does not want obstructed.

FIG. 3C shows diagram 510 is an example of image 68 of a business program as shown in previous FIG. 3B. At the bottom of screen 68, progress bar 82 is covering news scroll area 70 and stock ticker scroll area 72. In this configuration, the viewer is not able to see the contents of either area.

FIG. 3D shows diagram 512 that includes image 68 of the same business program as shown in previous FIG. 3C. Here, viewer 20 is using commands on the remote control 22 to move the previously positioned progress bar 82 through path 83 to a newly positioned progress bar 84 at the top of image 68 at the top of image 68. This allows ticker tape bars 70, 72 to be viewed by the viewer 20 when sending trick-play commands to set-top box 28.

In one or more embodiments as shown in FIG. 3C and FIG. 3D, the viewer 20 issues commands to move the progress bar by selecting buttons on the remote control 22. In one embodiment, these commands may include using arrow keys, trackpads, a roller ball, or other similar input device in conjunction with one or more button presses on remote control 22. These commands are sent to set-top box 28, which causes set-top box 28 to move the location and/or reorient the position of the progress bar on display 24. For example, viewer 20 may only move the progress bar to a different location as described above, or may send commands to reorient the progress bar from horizontal to vertical orientation as shown in FIG. 3B progress bar 80. In addition, other commands may change the appearance of the progress bar, for example displaying progress bar 82 with various degrees of transparency, or removing progress bar 82 altogether from the screen for a fixed period of time, for example five seconds, or until another command is issued from remote control 22. This process is described in more detail in flowchart 522 in FIG. 4C.

Figure 3E:
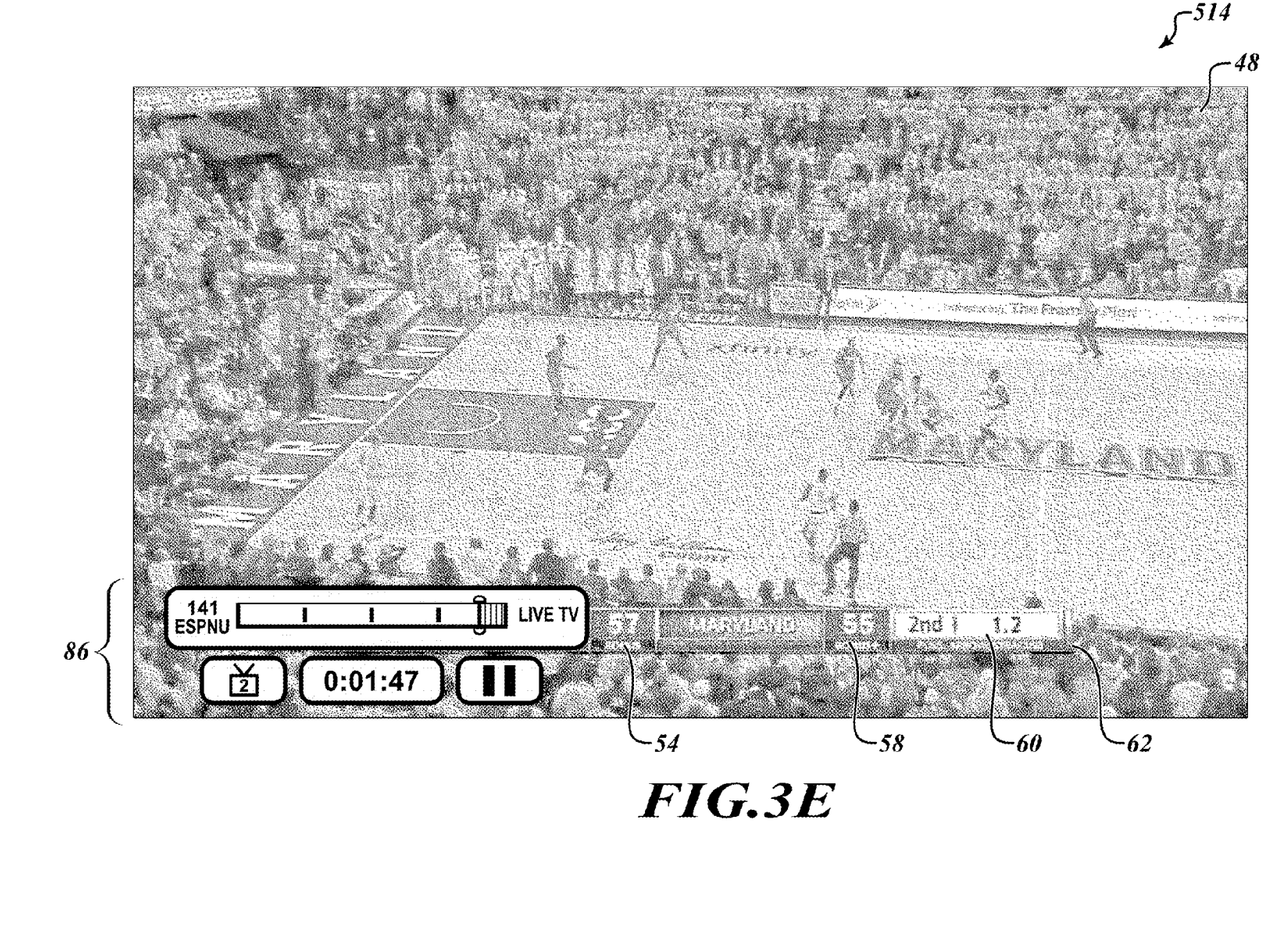

FIG. 3E shows diagram 514 that includes image 48 showing a basketball game that includes an example of an information bar 62 and a progress bar 86 that has been modified from the regular progress bar 64 shown in FIG. 2B. In one or more embodiments, the progress bar placement system 144, or viewer 20 using remote control 22, has modified the shape of progress bar 86 to be shortened. The shortened progress bar 86 allows the display of the information content bar 62, which includes the game clock 60, first team score 58, and second team score 54.

Figure 3F:
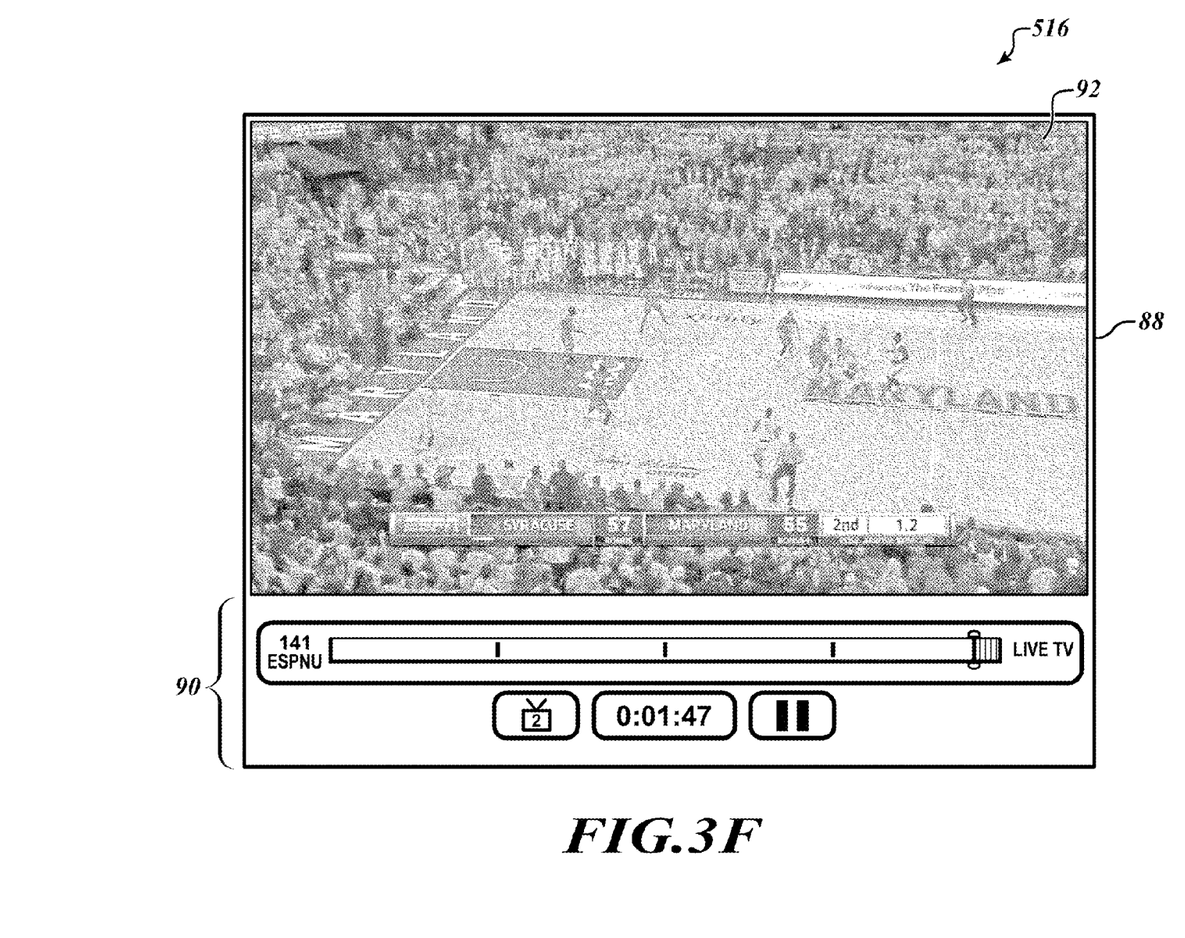

FIG. 3F shows diagram 516 that includes image 92 of a basketball game shown within audiovisual content display area 88. In this embodiment, the position of progress bar 90 has not been changed. Instead, to make sure that important information is not obscured, the display area of image 92 has been reduced in size vertically to allow progress bar 90 to be displayed between the bottom of image 92 and the bottom of display area 88 were no audiovisual content is being displayed. In this embodiment, because progress bar 90 will always be displayed outside of display area 92, the progress bar will not obstruct any important locations within image 92.

Figure 4A:
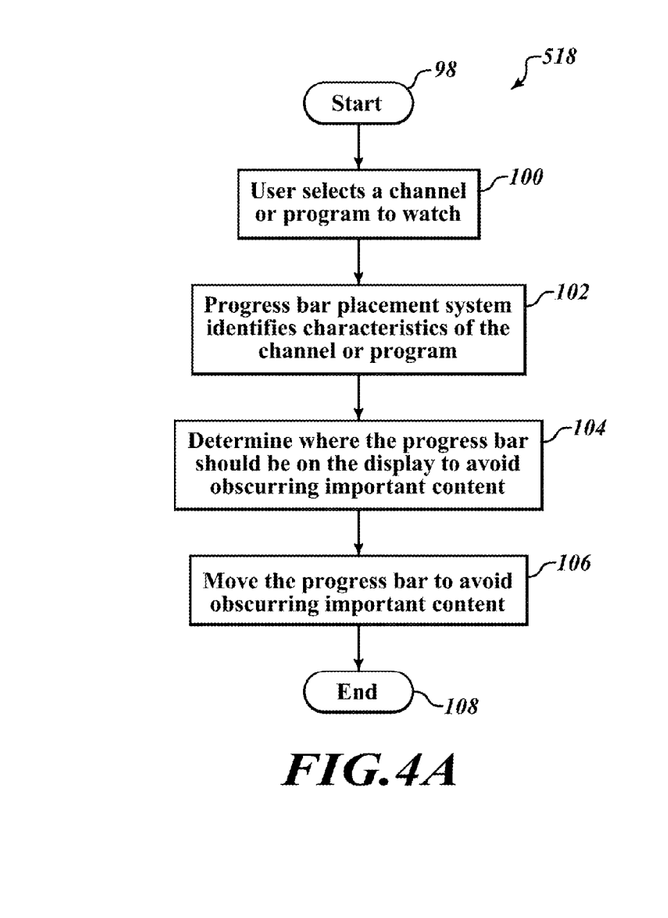
FIGS. 4A-4C show example flow diagrams for determining where to move the progress bar on a display.

FIG. 4A is a flow diagram 518 that describes one embodiment of a process for moving the progress bar to avoid obscuring important content on display device 24. The process starts at step 98.

At step 100, the user selects audiovisual content to display on display device 24, for example by selecting a channel or a specific program to watch. In some embodiments, the user may also select a recorded program stored set-top box 28 or a recording that is stored, for example, on DVR 30.

At step 102, the process identifies the characteristics of the channel or the program that the viewer is watching in order to determine where important information may be located on the audiovisual display that should not be obstructed by a progress bar. These characteristics may be located in data stored within video content signal, data within data channels associated with the video content signal, or data received through other sources such as a location on the internet. These characteristics include location information on the screen that indicates important information that should not be obstructed by a progress bar.

At step 104, the process determines where the progress bar should be placed on the display to avoid obscuring important content by using the characteristics received in step 102.

At step 106, the process moves the progress bar to a location on the screen to avoid obscuring important content that is being displayed on the screen whenever viewer 20 initiates a trick-play command causing the progress bar to appear.

At step 108, the process ends.

Figure 4B:
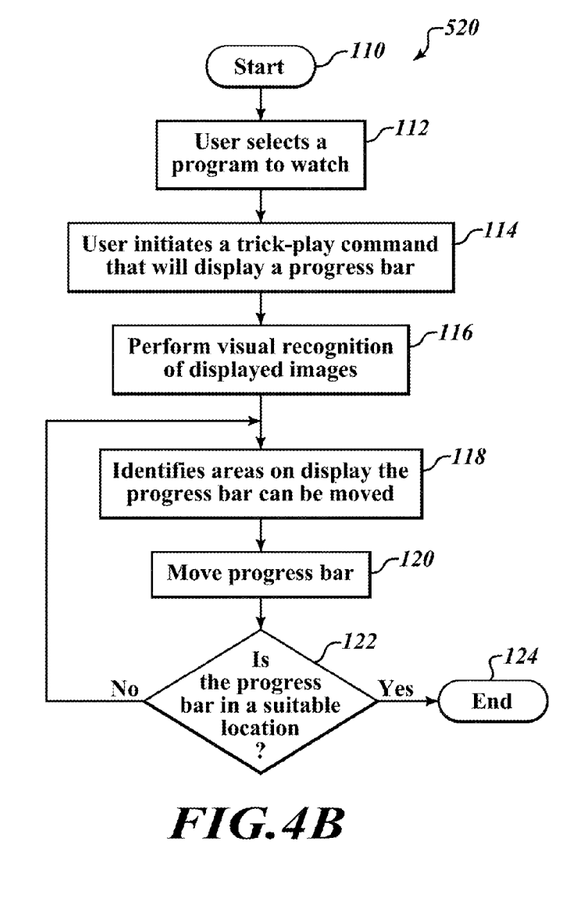

FIG. 4B shows flowchart 520 that describes one embodiment of a process for placing a progress bar on display device 24 based on visual analysis of the audiovisual content displayed.

At step 110, the process starts.

At step 112, viewer 20 selects an audiovisual program to watch on display device 24. The viewer 20 may select a specific program to watch, for example a program that has been prerecorded on the viewer's set-top box 28, or viewer 20 may select a particular channel that displays a series of programs and sequences.

At step 114, viewer 20 initiates a trick play command to set-top box 28 that will display a progress bar on display 24. For example, viewer 20 will use remote control 22 to send a pause, rewind, or fast forward command.

At step 116, the process performs a visual recognition analysis of the audiovisual image currently displayed by set-top box 28 onto display 24. In some embodiments, this analysis includes text recognition to identify keywords, numbers, or certain formats of numbers. The analysis may also include graphical image recognition to identify logos, borders, or other indications of important content on display 24. In addition, information on how to recognize text or graphics moving from frame to frame may also be used to determine indications of important content. For example, if the word "score" continuously appears in the same position on display 24 for five minutes or more, then it is likely the area around the word "score" is an important area that viewer 20 would not want obstructed. However, if "score" appeared only for a few seconds it is unlikely that the area around that word would be an important area to viewer 20.

At step 118, the process uses the information from step 116 to identify areas on the display where the progress bar can be moved and not obstruct important information to viewer 20.

At step 120, the process moves the progress bar to a new location on the screen so that important information is not obstructed.

Figure 4C:
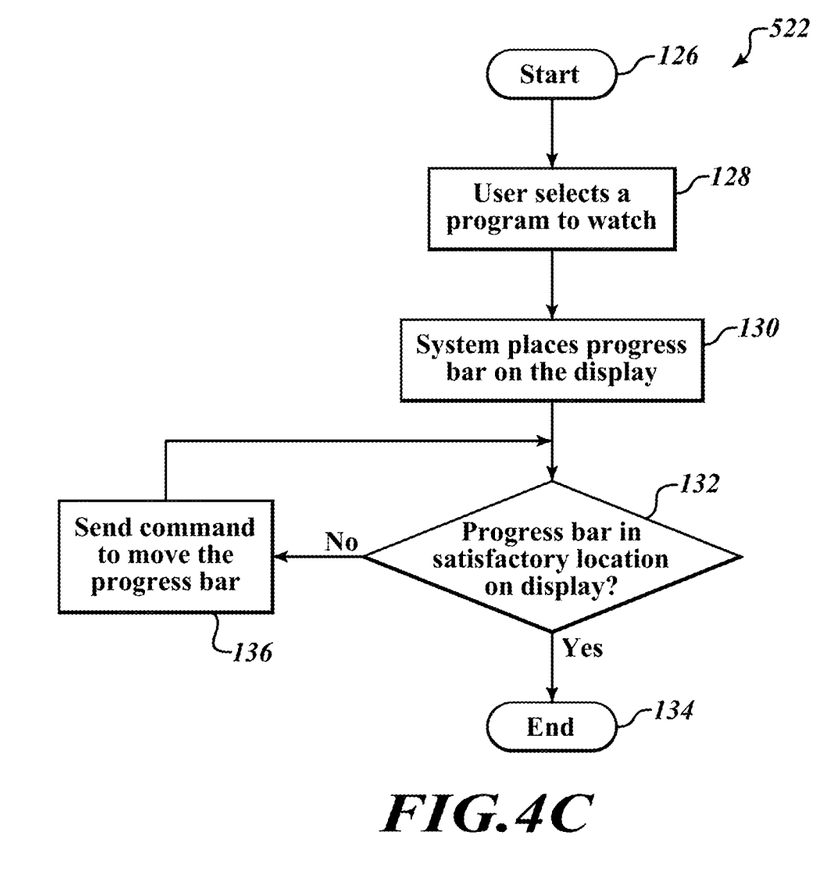

At step 122, if the location of the progress bar is acceptable to viewer 20, then the process ends at step 124. Otherwise, flow goes back to step 118, where the process reanalyzes and identifies areas for the progress bar to be moved. In other embodiments, if the process is unable to select a location for the progress bar that is acceptable to viewer 20, the viewer may decide to manually place the progress bar using one of the other embodiments described herein, for example at flowchart 522.

FIG. 4C shows flowchart 522 that describes one embodiment of a progress bar placement process for a viewer 20 to send a command to a set-top box 28 to move the position of the progress bar. At 126, the process starts.

At step 128, the viewer 20 selects a program to watch on the display 24.

At step 130, a progress bar is placed on the screen. In some embodiments, the progress bar is placed in a default location, such as near the bottom of the display 24. In other embodiments, there is a first attempt to determine locations on the display 24 that are appropriate to place the progress bar on before selecting a location for the progress bar.

At step 132, the viewer 20 views display 24 to determine whether the progress bar is in the satisfactory location on the display. If the viewer 20 is satisfied with the location of the progress bar, the viewer indicates that to the system via remote control 22 and the process ends at 134.

Otherwise, at step 136, the viewer 20 sends a command to the set-top box to move the progress bar to a different location on the display. In one embodiment, the viewer 20 would use the remote control 22 to accomplish this step. The viewer 20 would select a button that controls the position of the progress bar and then use the up, down, left or right arrows to move the location of the progress bar on the screen. When the viewer 20 is satisfied with the location of the progress bar, the viewer 20 presses a button to return control of the remote to its normal function. At this point, flow reverts back to step 132.

Figure 5:
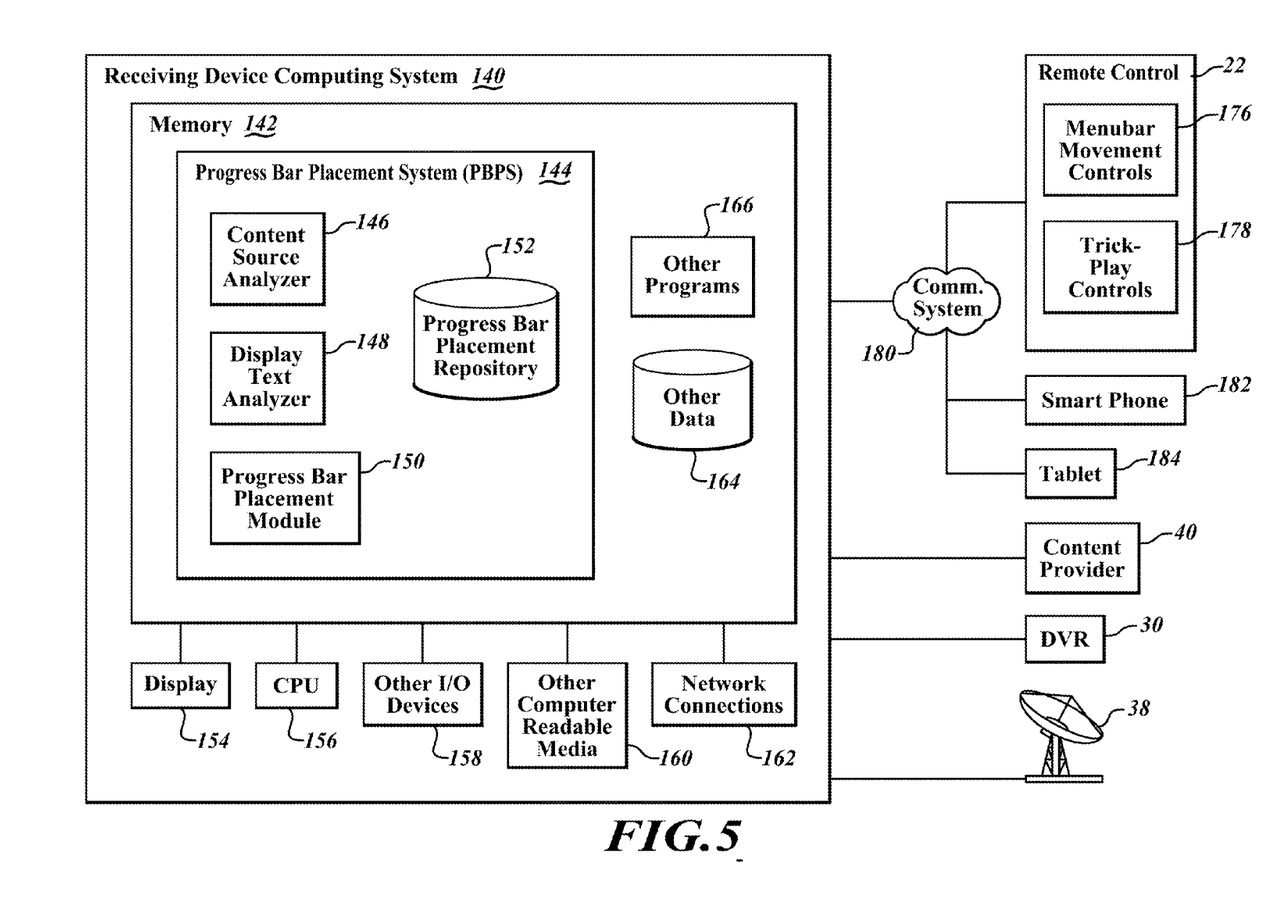
FIG. 5 is a schematic diagram of a computing environment in which systems and methods for selectively displaying a progress bar on a display are implemented.

FIG. 5 is a diagram of a computing system for implementing embodiments of selective placement of a progress bar. FIG. 5 includes a computing system 140 that may be utilized to implement a progress bar placement system ("PBPS") system 144 with features and functions as described above. One or more general-purpose or special-purpose computing systems may be used to implement the PBPS system 144. More specifically, the computing system 140 may include one or more distinct computing systems present having distributed locations, such as within a set-top box, or within a personal computing device. In addition, each block shown may represent one or more such blocks as appropriate to a specific embodiment or may be combined with other blocks. Moreover, the various blocks of the PBPS system 144 may physically reside on one or more machines, which may use standard inter-process communication mechanisms (e.g., TCP/IP) to communicate with each other. Further, the PBP is system 144 may be implemented in software, hardware, firmware or in some combination to achieve the capabilities described herein.

In the embodiment shown, computing system 140 includes a computer memory 142, a display 154, one or more Central Processing Units ("CPU") 156, Input/Output devices 158 (e.g., keyboard, mouse, joystick, track pad, LCD display, smart phone display, tablet and the like), other computer-readable media 160 and network connections 162 (e.g., internet network connections). In other embodiments, some portion of the contents of some or all of the components of the PBPS system 144 may be stored on and/or transmitted over other computer-readable media 160 or over network connections 162. The components of the PBPS system 144 preferably execute on one or more CPUS 156 and generate content from images and other information put into the system by users or administrators, as described herein. Other code or programs 166 (e.g., a Web server, a database management system, and the like) and potentially other data repositories, such as data repository 164, also reside in the memory 142, and preferably execute on one or more CPUs 156. Not all of the components in FIG. 5 are required for each implementation. For example, some embodiments embedded in other software do not provide means for user input, for display, for a customer computing system, or other components, such as, for example, a set-top box or other receiving device receiving audiovisual content.

In a typical embodiment, the PBPS system 144 includes a content source analyzer 146, a display text analyzer 148, a progress bar placement module 150 and a progress bar placement repository 152. Other and/or different modules may be implemented. In addition, the PBPS system 144 interacts with communication system 180 with remote control 174, smart phone 182 and tablet 184.

The content source analyzer 146 performs at least some of the functions of analyzing content as described with reference to FIG. 3A and FIG. 4B. In particular, the content source analyzer 146 interacts with the viewer 20 and other systems to identify the source of the content, for example data associated with the channel or content provider 40 from which the audiovisual content is received or data associated with the individual program displayed. Characteristics of this content is then determined using this data to identify locations associated with audiovisual presentation of content on a display that should not be obscured by a progress bar. This data may be obtained from data within the audiovisual content signal or data signals associated with the content signal. The data may also be retrieved from data source 164 within computing system 140 or elsewhere from data accessible via network connection 162. In one embodiment, this information is stored in the progress bar placement repository 152 for processing by other components of the PBPS system 144.

In some embodiments, the content source analyzer 146 may act as a content cache manager, such that it preferentially provides content to other components such as the display text analyzer 148 or progress bar placement module 150.

The display text analyzer 148 performs at least some of the functions of determining areas of important information presented on the display as described in FIG. 2B and FIG. 4B. In particular, the display text analyzer identifies areas on the display where important information is shown, so that the placement of the progress bar on the screen does not obscure these areas. In some embodiments, the display text analyzer 148 analyzes the audiovisual content presented on the display device 24 using existing text recognition algorithms or graphics recognition algorithms or other programs 166 to determine the placement of text on the display. It then compares the text that is recognized to text that indicates important areas on the display that should not be obscured by a progress bar. For example, in a basketball game the words "team", "score", "time remaining", and the like can indicate areas of important information that should not be obscured. Similarly, numbers having an "hh:mm" format can indicate the position of a game clock that should not be obscured. In some embodiments, the display text analyzer may also look for logos or other symbols that may indicate important information such as a dial of a clock that indicates a game clock. In one or more embodiments, keywords or phrases, in addition to logos or other graphic images, may be stored in the progress bar placement repository 152, other data database 164, or other accessible location. Once important areas associated with audiovisual content presented on a display are determined, these areas, in addition to identifiers associating the related audiovisual content, may be stored in the progress bar placement repository 152 to be referenced with the audiovisual content that appears on display device 24 in the future.

The progress bar placement module 150 performs at least some of the functions described above of placing the progress bar on display device 24 in response to the viewer 20 commands sent via remote control 22 to set-top box 28 for trick-play requests using trick-play controls 178 to issue commands such as pause, rewind and fast-forward. Progress bar placement module 150 receives information about the audiovisual content displayed on the display device 24 from the content source analyzer 146 and from the display text analyzer 148. Information can also be received from the progress bar placement repository 152 and from commands sent from viewer 20 using remote control 22 to determine areas on display device 24 where the progress bar can be displayed without obscuring information that is important to viewer 20.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    displaying audiovisual program content on a display device for viewing by a user;
    displaying text on the same display device concurrently with the audiovisual program content, the text describing an aspect of the audiovisual program content that is being displayed;
    receiving a remote control command from the user, the command indicating a rate at which the audiovisual program content is to be displayed on the display device;
    changing the rate that the audiovisual program content is displayed on the display device to the indicated rate;
    identifying, using image recognition, a display location of the text;
    determining a display location of a visual progress bar that does not overlap with the display location of the text or obscure the text;
    displaying the visual progress bar on the display device in accordance with the determined display location of the visual progress bar; and
    displaying the audiovisual program content at the indicated rate concurrently with the visual progress bar.

2. The method of claim 1 wherein the rate at which the audiovisual program content is displayed on the display device is 4× fast-forward.

3. The method of claim 1 wherein the rate at which the audiovisual program content is displayed on the display device is 4× reverse.

4. The method of claim 1 wherein the visual progress bar is displayed horizontally.

5. The method of claim 1 wherein the visual progress bar is displayed vertically.

6. A method, comprising:
    receiving audiovisual program content;
    displaying the audiovisual program content on a display device at a first rate of display;
    receiving a command indicating a second rate at which the audiovisual program content is displayed on the display device, the second rate being different than the first rate;
    identifying, using image recognition, a location of a text description within the audiovisual program content;
    determining a location of a visual progress bar to be displayed on the display device, the visual progress bar indicating the second rate at which the audiovisual program content is displayed on the display device, the visual progress bar being shown at a location on the display device that does not obscure the text description; and
    concurrently outputting the audiovisual program content at the second rate and the visual progress bar to the display device.

7. The method of claim 6 wherein the text description is associated with the audiovisual program content of a sporting event.

8. The method of claim 6 wherein the text description is closed-captioning text.

9. The method of claim 6 wherein the text description is translation of dialog spoken in a foreign language.

10. The method of claim 6 wherein the text description is the game clock of a sporting event.

11. The method of claim 6 wherein the text description is breaking news.

12. A system, comprising:
    a receiving device operable to receive audiovisual content, to store the audiovisual content, and to output the audiovisual content for use on a display device;
    a control device operably connected to the receiving device used to send commands to the receiving device; and
    a processing module on the receiving device configured to:
        receive the audiovisual content,
        identify, using image recognition technology, a location of text description in the audiovisual content,
        receive from the control device a request that controls a display rate of the audiovisual content,
        determine, based at least in part on the location of the text description, a position of a visual progress bar on the display device that shows at least the display rate of the audiovisual content, the position of visual progress bar being determined such that the visual progress bar does not obscure the text description, and
        output the combined audiovisual content and visual progress bar for use on the display device.

13. The system of claim 12 wherein determining the position of the visual progress bar further comprises:
    receiving at least one source characteristic of the audiovisual content;
    based at least on the at least one received source characteristic, determining the position of the visual progress bar.

14. The system of claim 12 wherein determining the position of the visual progress bar further comprises:
    receiving from the user an indication of where the progress bar should be positioned; and
    determining the placement of the progress bar based on the user indication.

15. The system of claim 12 wherein determining the position of the visual progress bar further comprises:
    determining a length of the progress bar.

16. The system of claim 15 wherein determining the position of the visual progress bar further comprises:
    positioning the progress bar either vertically or horizontally.

* * * * *